March 21, 1933. E. WILDHABER 1,902,683
WORM GEARING
Filed Sept. 3, 1931 2 Sheets-Sheet 1
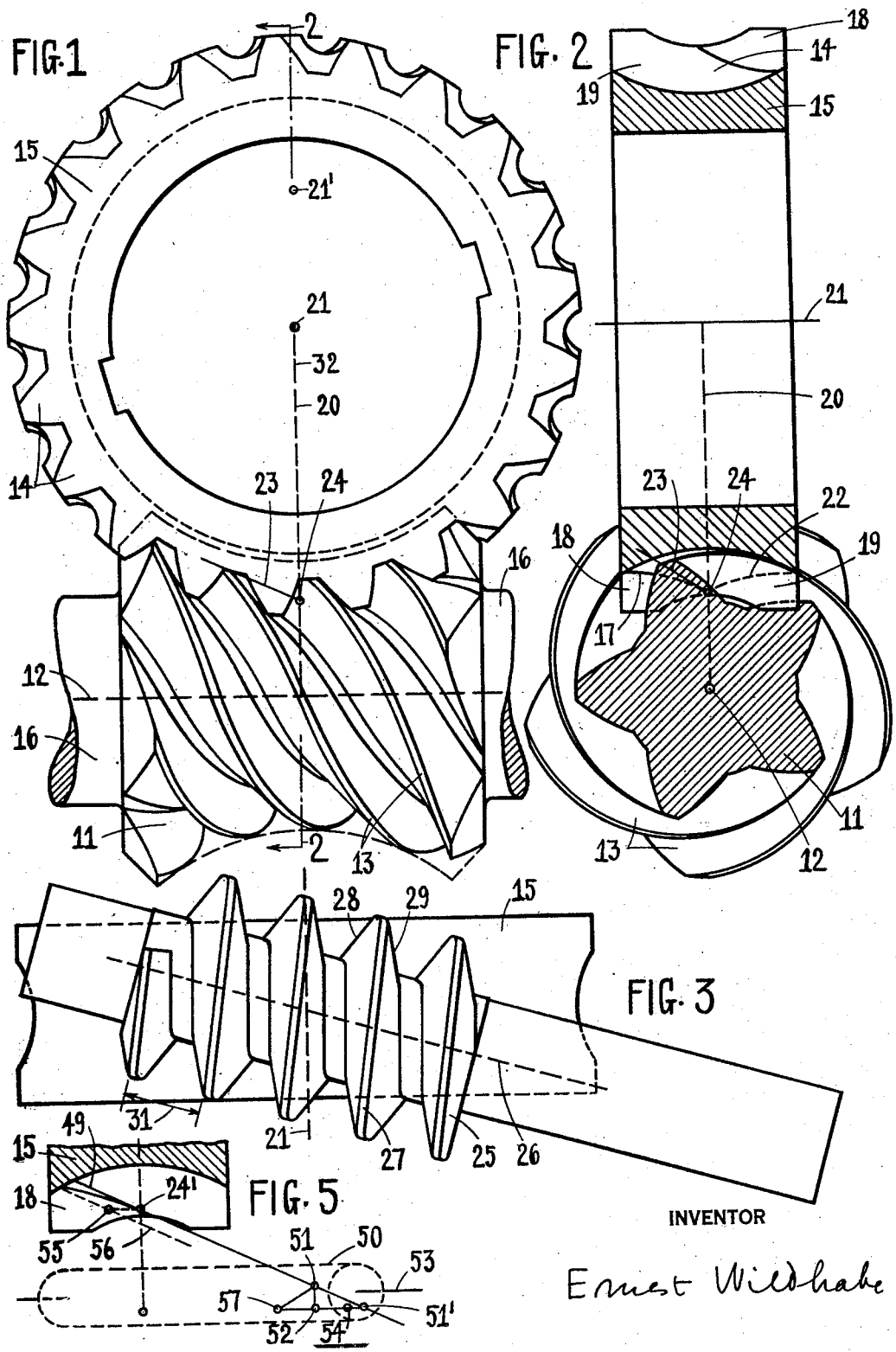
INVENTOR
Ernest Wildhaber March 21, 1933.  E. WILDHABER  1,902,683
WORM GEARING
Filed Sept. 3, 1931.  2 Sheets-Sheet 2
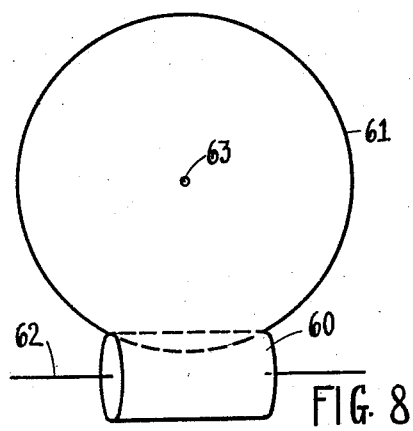
FIG. 8
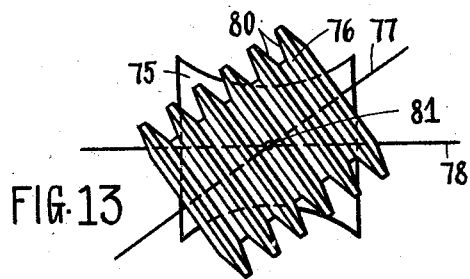
FIG. 13
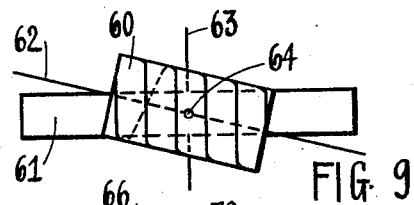
FIG. 9
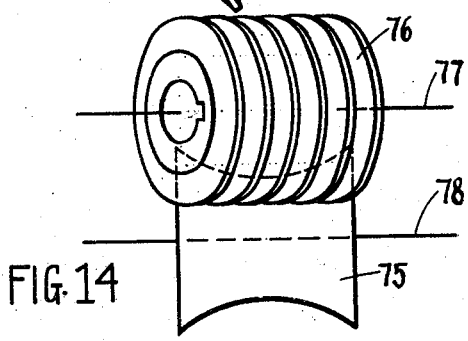
FIG. 14
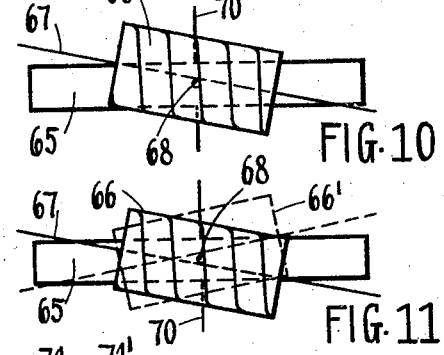
FIG. 10
FIG. 11
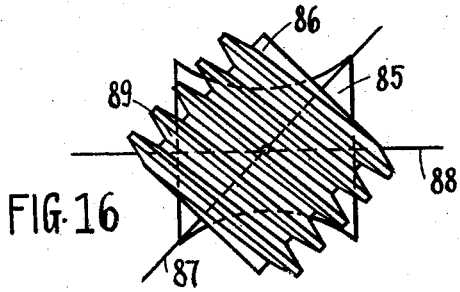
FIG. 16
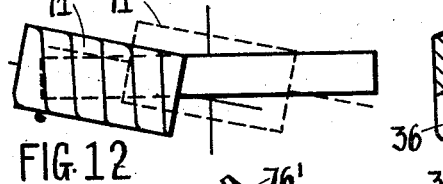
FIG. 12
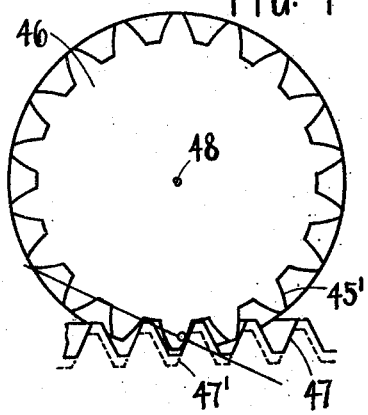
FIG. 4
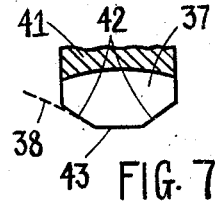
FIG. 6
FIG. 7
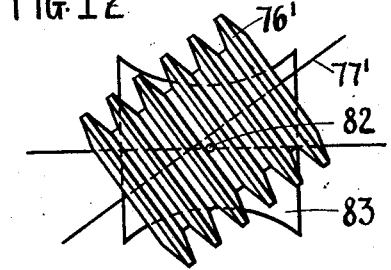
FIG. 15
INVENTOR
Ernest Wildhaber Patented Mar. 21, 1933

1,902,683

UNITED STATES PATENT OFFICE

ERNEST WILDHABER, OF BROOKLYN, NEW YORK

WORM GEARING

Application filed September 3, 1931. Serial No. 560,905.

The present invention relates to worm gearing, comprising a worm and a worm wheel or segment, and particularly to the type of worm gearing containing a non helical worm.

One object of the present invention is to provide an improved tooth form, which may be accurately and readily produced and duplicated.

Another aim is to devise a practical worm wheel having composite tooth surfaces which are conjugate to single tooth surfaces of a non helical worm, so that points of the worm thread have a double engagement with the worm wheel.

Another object of the present invention is to provide worm gearing departing slightly from fully matched worm gearing, in a manner to allow for slight relative displacements of the worm gearing under load.

A further object of the present invention is to devise improved worm gearing, in which the worm wheel or broadly a worm gear is provided with composite tooth surfaces; and to devise said surfaces so that they may be efficiently produced with high accuracy, and with the same tool.

Another aim in view is to devise composite tooth surfaces for worm wheels and broadly for worm gears suited to mesh with non helical worms or worm gears, said composite tooth surfaces containing two surfaces joining each other along an oblique line, one of said surfaces being free from concave curvature, the other of said surfaces being a mating surface of a cylindrical member having tooth like projections of constant profile.

A further aim is to provide composite tooth surfaces of the above said character, of which one component surface is a mating surface of a helical member, or of a circular rack, or of a spur gear, so that said component surface may be swept in its entirety by said helical member, or circular rack, or spur gear, during rotation in a single bodily position.

A further aim is to devise a worm wheel having composite tooth surfaces, a component surface of said composite tooth surfaces having a shape as may be completely described on a rotating blank by a single cutting edge, when said cutting edge is turned about an axis and is fed in a straight path angularly disposed to a plane perpendicular to the blank axis.

A still other object is to provide an improvement of the tooth forms first disclosed in my Patent 1,797,461 entitled "Method of forming gears".

Other objects will appear in the course of the specification and from recital of the appended claims.

The term worm wheel is here understood throughout to include segments as well as complete worm wheels. The present invention is applicable to all kinds of worm gearing, such as gearing for power transmission, timing gears, steering gears and so on. The term worm gear is meant to include worms as well as worm wheels.

In the accompanying drawings

Fig. 1 is a view of a worm and worm wheel constructed according to one embodiment of the present invention, the view being taken in the direction of the wheel axis.

Fig. 2 is a section along lines 2—2 of Fig. 1.

Fig. 3 is a diagrammatic front view of the worm wheel shown in Fig. 1 and of a helical threaded member, to which one portion of the tooth surfaces of said worm wheel are fully conjugate.

Fig. 4 and Fig. 5 are diagrams illustrative of the nature of production of another portion of the tooth surfaces of said worm wheel.

Fig. 6 is a partial axial section of a right hand worm wheel, similar to Fig. 2, and referring to another embodiment of my invention.

Fig. 7 is a partial axial section of a worm wheel, similar to Fig. 6, but referring to an arrangement where the worm wheel is narrow.

Fig. 8 is a diagrammatic plan view of a worm wheel, in engagement with a cylindrical member, to which a portion of the worm wheel teeth are fully conjugate.

Fig. 9 is a front view corresponding to Fig. 8.

Fig. 10 is a diagram illustrative of a modification. Fig. 10 can also be considered a front view corresponding to Fig. 8.

Fig. 11 is a diagram further illustrative of the modification also referred to in Fig. 10.

Fig. 12 is a diagram further explanatory of one form of the present invention.

Fig. 13 is a diagrammatic plan view of a circular rack in engagement with a non helical worm, whose surfaces are mating surfaces of the side surfaces of said circular rack. The worm here illustrated is devised to mesh with a worm wheel having composite tooth surfaces, in accordance with the present invention.

Fig. 14 is a front view corresponding to Fig. 13.

Fig. 15 is a diagrammatic plan view similar to Fig. 13, and illustrative of a different bodily position of a circular rack, in accordance with another aspect of my invention.

Fig. 16 is a diagrammatic plan view of a helical threaded member in engagement with a non helical worm, whose surfaces are mating surfaces of said helical member and are defined thereby.

In Fig. 1 and Fig. 2, numeral 11 denotes a worm having an axis 12 and containing teeth or threads 13, which are suited to mesh with the teeth 14 of worm wheel 15. The worm illustrated is formed integral with its shaft 16, of which only portions are shown. Worm 11 and wheel 15 are journalled in known manner in suitable bearings omitted in the drawings.

In contradistinction to a known form of worm, which has a constant axial pitch and equal thread profiles in all sections perpendicular to the worm axis, worm 11 is a non helical worm: Its thread profiles change lengthwise of its axis. The worm is preferably of hour glass form, as illustrated.

In devising the embodiment illustrated in Fig. 1 and Fig. 2, I have made use of the principles laid down in my companion application entitled "Worm gearing", filed September 3, 1931, Serial No. 560,904.

It is shown there, that a very intimate tooth contact may be obtained, by providing composite tooth surfaces on the worm wheel, a composite tooth surface containing two surfaces joining smoothly in an oblique line 17, Fig. 2 of present application, which in the instance illustrated passes through the pitch point (24). One of said surfaces is conveniently made free from concave curvature. This surface (18, Fig. 2) is preferably made smaller than the other surface (19) and preferably larger than one fifth of the total composite tooth surface. The other of said two surfaces generally contains a concave curvature in a direction lengthwise of the teeth. It provides the most intimate tooth contact and corresponds to a mathematical surface of action, which intersects a plane 20 (Fig. 1) containing the wheel axis 21 and perpendicular to the worm axis 12, in a curve. This curve extends from the pitch point 24 in a general direction towards the wheel axis and sidewise, the sidewise direction being opposite to the direction of the projected tooth normal 23 at pitch point 24. This curve is indicated in dotted lines 22 in Fig. 2.

In accordance with one embodiment of the present invention, the worm wheel is provided with a composite tooth surface, of which one component surface (19) is the mating surface of a helical threaded member 25 so that surface 19 may be swept in its entirety by said member (25), when said member and the worm wheel are rotated on their axes 26 and 21 in a single bodily position, see Fig. 3. In other words the component surfaces 19 of the worm wheel may be swept completely by turning member 25 and worm wheel 15 on fixed centers, without bodily displacing said member and said worm wheel with respect to each other. Tooth contact is made along lines or along a line in any one turning position. These lines move over or sweep the component surfaces 19, as the worm wheel and said member are turned.

The other component surface 18 of the composite tooth surface may be produced in various ways, of which some will be described hereafter.

Oblique line 17, Fig. 2, preferably corresponds to a joint line of action of the two component surfaces 18, 19, so that both component surfaces contain joint tangential planes along said line and join each other smoothly. The said joint line of action is usually a straight line perpendicular to the tooth surface.

Member 25 preferably contains an involute helical thread 27 or several involute helical threads. Involute helical threads are known to contain involute profiles in planes perpendicular to the axis of the threaded member. They appear straight sided in any view in which the thread contour may be seen. So the sides 28, 29 of thread 27 appear as straight lines in projection. Involute threads may be enveloped and formed by a plane, which is moved lengthwise of the axis of a member, while said member is turned on its axis in a constant proportion to said axial motion. The profile of an axial section of an involute helical thread is convex in principle. It is nearly straight when the lead angle of said thread is small, as when a single thread is provided. And it is the more convex, the larger the lead angle of the considered involute helical thread.

Preferably the number of threads 27 of member 25 is smaller than the number of threads of the mating worm (11) of worm wheel 15. Also the outside diameter of member 25 is smaller than the outside diameter of worm 11 at its gorge, and member 25 is offset from the wheel axis 21 a distance smaller than the center distance of the worm 11 and the worm wheel 15.

Moreover the mean pressure angle of the helical member 25 is preferably smaller than the pressure angle of the worm gearing at its pitch point 24, and the lead 31 of helical member 25 is preferably made smaller than the lead of a helical member, which matches the worm wheel at its pitch point and which contains the same diameter and the same number of threads.

The term pitch point is well establshed. It is the point of the shortest connection line 32 (see Fig. 1) between the axes 12 and 21, at which point the thread inclination of the worm, or its lead angle, matches the tooth inclination of the worm wheel. The pitch point can also be considered as the intersection point of the surface of action of the worm gearing (11, 15) with the shortest connection line 32 of its axes. The term pressure angle at the pitch point is understood to be the inclination of the tooth normal at the pitch point, with respect to a plane parallel to the axes 12, 21. This plane is also perpendicular to line 32. The mean pressure angle of the helical thread (27) is understood to be the mean inclination of a thread side with respect to a radius drawn perpendicular to the thread axis. These definitions are in accordance with the conventional use of the terms.

In general, helical member 25 meshes in a different manner with the surfaces 19 of the wheel teeth than worm 11. Tooth contact is made along different lines, which however sweep the same surfaces 19. Also any point of surface 19 makes contact with member 25 in a different turning position as compared with the turning position, at which it makes contact with the worm (11). So the point of the surface 19, which in one turning position coincides pitch point 24, engages the thread 27 in a different turning position, in which it is outside of the shortest connecting line between the wheel axis 21 and axis 26. In this different turning position the tooth normal at said point includes a smaller angle with a plane parallel to the axes 21, 26 than the pressure angle at the pitch point 24 (Fig. 1 and Fig. 2).

If the helical member would mesh along the same lines and along the same surface of action with the worm wheel as the worm of hour glass form, it would be practically impossible to reach as large an area of surface 19 with a cylindrical member as with a worm of hour glass form.

Adjacent the ends, the worm of hour glass form reaches deeper into the tooth spaces of the worm wheel, than any practical cylindrical member. Accordingly the hour glass worm would then sweep a larger area of surface 19 than the cylindrical member could reach, and a surface 19 mating the cylindrical member would still interfere with the worm, as not extending far enough.

This difficulty also exists to some extent, when a helical member is provided which matches the worm wheel at its pitch point. I have discovered that through provision of a helical member of reduced pressure angle and of reduced lead, as pointed out above, the aforesaid difficulties may be entirely overcome.

A suitable way of determining the position of member 25 will be described hereafter.

Fig. 6 illustrates a modified embodiment of the present invention. Wheel tooth 35 contains a composite tooth surface, whose individual surfaces 36, 37 meet smoothly in an oblique line 38 which passes outside of the pitch point 40. Surface 36, adjacent the side of smaller pressure angle, is preferably free from concave curvature, and in any case extends wholly back of the continuation of surface 37, except at the joining line 38. Surface 37 contains a concave curvature in a direction lengthwise of its teeth. Surface 36 is here much smaller than surface 37, but preferably is larger than one fifth of the total composite tooth surface.

In the embodiment indicated in Fig. 7, the same surface 37 is provided as described with reference to Fig. 6. Wheel 41 of Fig. 7 is however made so narrow, that provision of a surface 36 may be avoided.

The wheel body is turned to a shape having oblique sides 42, which coincide substantially with line 38 of Fig. 6. In both cases therefore surface 37 terminates along an oblique line, which extends substantially in the direction of a projected tooth normal of said line, and which is ordinarily inclined less than 40° to a line 43 parallel to the wheel axis.

Ways of forming worm gearing of the present invention will now be described.

One may start with the worm, and assume an hour glass worm of such tooth shape or thread shape as can be readily and accurately produced. Preferably the thread sides of the worm are assumed mating surfaces of a circular rack (76, Fig. 13 and Fig. 14) or of a cylindrical member (86, Fig. 16). Said member may contain a helical thread (89) or helical threads or teeth, or also straight teeth extending lengthwise of its axis. Preferably the circular rack (76) or cylindrical member (86) form part of the involute system, so that the circular rack contains straight profiles in an axial section and therefore conical side surfaces (80), and that the cylindrical member contains involute profiles in planes perpendicular to its axis.

Said circular rack (76) or cylindrical member (86) may be so determined that any desired tooth form of the worm is approximated. Such determination is fully disclosed in my Patent 1,797,461 above referred to. So it may be desired to devise a worm nearly conjugate to helical tooth surfaces concentric with the axis of the worm wheel. The determination of suitable circular racks and helical members for forming such a worm is directly given in said patent. The worm gearing then obtained corresponds to the showing of Fig. 2, where line 17 is shown passing through the pitch point.

Worm gearing of the character indicated in Fig. 6 and Fig. 7 may be obtained by assuming a circular rack or a cylindrical member of larger diameter than just described, or by computing the circular rack or cylindrical member so that the worm thread is approximately conjugate to helical tooth surfaces having an axis parallel to the axis of the worm wheel and further offset from the axis of the worm than said worm wheel axis. For instance the axis of such helical surfaces may be assumed at 21', Fig. 1.

After a worm is accurately made, one way of forming its worm wheel is by first making a hob exactly embodying said worm of hour glass form, and by cutting said worm wheel with said hob, whereby the hob is advanced to a final position equal to the relative position of the worm with respect to its worm wheel.

For quantity production it is however preferred to produce the worm wheel with a tool, usually a hob, which represents a cylindrical member containing helical threads as already described, or which represents a circular rack. The surfaces 19, Fig. 2, or 37, Fig. 6, of the wheel teeth may be produced as the mating surfaces of a helical threaded member or of a circular rack, which member or circular rack may be mathematically determined, if so desired, in accordance with the disclosure of Patent 1,797,461. An accurate and comparatively simple way of experimentally determining the position and form of the helical member or circular rack will now be described.

A worm wheel is first made with a hob which corresponds to the worm, as outlined above. If so desired the hob may be provided with cutting teeth, which contain narrow ribbons of the unrelieved worm thread adjacent the cutting edges. The cutting teeth are then relieved only back of said narrow ribbons, which follow the cutting edges. Hobs of this character may be easily and accurately finished after hardening, the finish being applied to said narrow unrelieved ribbons extending along the cutting edges.

After a worm wheel has been carefully completed, a helical member (25, Fig. 3) is assumed in accordance with the directions already given. Preferably the worm initially assumed is conjugate to a circular rack or helical member of the involute system, as already stated. In this case the helical member (25, Fig. 3) should contain an involute thread or threads. Involute threads are known to have a constant pitch in the direction of the thread normals or thread perpendiculars. The first requirement of the assumed helical member is that said pitch along the thread normals is the same as on the member to which the worm is fully conjugate. Then the number of threads of said member is assumed in a manner depending on the number of threads of the worm and on the lead angle of the worm at the pitch point. Said number of threads is preferably smaller than the number of threads of the worm and increases with increasing number of threads of said worm and with increasing lead angle. Usually a single thread may be conveniently assumed, at least to start with. The diameter of said member is assumed a little smaller than the gorge diameter of the worm. The pressure angle is preferably assumed smaller than the pressure angle of the worm gearing at the pitch point.

With the above assumptions made, the lead $L$ of the assumed helical member, and its lead angle $g$ at the base circle may be computed in known manner.

For convenience the formulas for computing these quantities are given below.

The following symbols are introduced for this purpose:

$r$ = Mean radius of the assumed helical member.

$a$ = Pressure angle at radius $r$ = inclination of thread normal at radius $r$ with respect to a plane perpendicular to a radial line.

$P_n$ = Linear pitch along thread normal or thread perpendicular.

$g$ = Lead angle at the base circle or also the constant inclination of any tooth normal with respect to the direction of the axis of the helical member.

$L$ = Lead.

Then $$\sin^2 g = \sin^2 a + \left(\frac{P_n}{2\pi r}\right)^2; \pi = 3.1416.$$

$$L = \frac{P_n}{\cos g}.$$

An involute helical member of the above characteristics is readily made in known manner.

It is then mounted on a testing machine in engagement with the above said worm wheel. The mesh in various positions is tested as usual in gear testing, namely by first covering the wheel teeth and the helical thread or threads with a thin layer of suitable color, for instance red lead, and by running the worm wheel and said member in engagement with each other while applying a slight braking load to the driven element.

A position is then experimentally determined, in which the thread surfaces of the worm sweep a large portion of the surfaces 19, or 37, of the wheel teeth. Such position may be arrived at by changing the center distance between the worm wheel and the helical member, the angle included between the directions of their axes, and moreover, if necessary by offsetting the helical member to one side of the center (68) of the worm wheel, as illustrated in Fig. 10 and Fig. 11, to be further described hereafter.

After a position is readily arrived at, where tooth contact is made adjacent the central portion of surface 10, or 37, but in which only a part of surface 19, or 37, is swept by the thread sides of member 25, other positions are located for instance by changing the setting angle a slight amount, and by then changing the offset between the axes of rotation, until the same central portion of surface 19 (or 37) is swept. If the aspect of the swept areas of surfaces 19 (or 37) is improved, one may continue the changes in the same direction until a fully satisfactory position is obtained. Otherwise a change in the opposite direction is made.

In order to obtain a certain mismatch between the surfaces of the worm gearing, to allow for slight displacements, an aspect of the wheel teeth is aimed at, where the color is more completely rubbed off adjacent the outside ends of surface 19 (or 37), than adjacent its central portion. A hob embodying member 25 will then remove a little more stock from said outside ends, than necessary for theoretically conjugate gearing.

If the swept portion of surface 19 (or 37) is only small, this in general indicates that the center distance between worm wheel 15 and member 25 should be increased, while the setting angle is changed correspondingly. If necessary a member 25 of larger diameter, but otherwise equal data is made. If on the other hand surface 19 (or 37) can be swept only at the ends, this indicates that the center distance should be reduced, while the setting angle is also changed. If necessary, a member 25 having a smaller diameter may be made.

If in the aforesaid manner no solution is found which fulfills very exacting requirements, then one may also test positions, in which the axis of the helical member is offset to one side from the center of the worm gear. Here also it is practical to vary only two settings at a time, for instance the lateral offset and the setting angle, or the lateral offset and the center distance.

With three quantities to choose so as to effect a desired match, excellent solutions are arrived at; and are arrived at with comparatively small effort, inasmuch as the settings on a testing machine may be readily changed. If so desired, and especially when a very large production is contemplated, other helical members 25 may also be made and similarly tested in various positions. Other pressure angles, sometimes other numbers of threads and other diameters may be assumed on these other members.

If in place of a helical member 25, a circular rack shall be used, its data may be determined experimentally in the same general manner.

Moreover, instead of assuming first the tooth form of the worm, as described, one may start by assuming the component surface of the worm wheel, which contains a concave curvature in lengthwise direction. This surface is then defined as the mating surface of a helical member (25) or circular rack, whose axis has an assumed position with respect to the worm wheel.

Thereafter a suitable cylindrical member is assumed, and the position of said member with respect to an accurately made worm is then determined on the testing machine, so that said member sweeps the thread surfaces of the worm in any desired manner. This procedure is analogous to the one described with reference to the worm wheel and helical member 25.

Referring again to the worm wheel, the nature of component surface 18, Fig. 2, or 36, Fig. 6, will now be further described, and also its production. Component 18 (or 36) furnishes a less intimate tooth contact and is smaller than component 19 (or 37). Often it is unnecessary to provide tooth contact at surface 18 (or 36), which then fulfills only the purpose to avoid tooth interference, as would occur when surface 19 (or 37) were continued beyond the limitations fully described in my companion application above referred to.

Frequently component surface 18 (or 36) is made an involute helical surface, or broadly a surface free from concave curvature, and in any case a surface which stands wholly back of the continuation of the other component surface 19 (or 37), except at their joining line.

Preferably component surface 18 (or 36) is made such that both component surfaces can be produced with the same tool. For instance surface 18 (or 36) may be made during the approach or recess of a hob with respect to a wheel blank, whereas the other component surface 19 (or 37) of said wheel blank may be formed in the position of closest approach of the hob axis and wheel axis. The production of an involute helical surface 18 (or 36) will now be described with reference to Fig. 4 and Fig. 5.

In Fig. 4 the involute helical tooth sides 45' of a wheel 46 are shown in engagement with the straight sides 47 of a rack, which is indicated through its profiles only. It is well known that a rack may mesh correctly with involute tooth surfaces regardless of the distance of the rack from the wheel center 48. So the rack may mesh correctly with said involute helical tooth surfaces also at the increased distance, which corresponds to a position 47' of the rack profiles.

Similarly an involute helical member (such as 25, Fig. 3) is capable of meshing with said involute helical surfaces regardless of its center distance.

Contact between said rack and tooth sides 45' of wheel 46 is maintained during the approach or recess of the rack, when an additional peripheral movement is imparted to the rack, so namely as if the rack would be displaced along its plane tooth sides which engage sides 45'. This additional movement is in a constant proportion to the approach or recess, and may be readily computed.

Likewise contact between involute helical tooth surfaces of a wheel and one thread side of an involute helical member (25) may be maintained, when during the approach or recess the member or the wheel is additionally turned in a constant proportion to the approach or recess.

Fig. 5 serves to show that during approach or recess, the entire extent of the helical surfaces may be enveloped with a threaded helical member (25). In Fig. 5 an axial section of worm wheel 15 is indicated in the turning position, where contact between a wheel tooth and a helical member (25) is effected at point 24', which in a different turning position of the wheel coincides with the pitch point 24, Fig. 1. In the position of closest approach action between involute helical surface 18 and said member takes place along a straight line of action 49, which is identical with the tooth normal at point 24'. Line 49 is tangent to the cylindrical base surface of said member, that is to say tangent to the surface shown in dotted lines 50.

The direction of the straight line of action depends only on the angular position of the threaded member with respect to the worm wheel, and on the nature of the contacting surfaces, but not on the center distance. The direction of the line of action is therefore always the same, in all positions of approach or recess. The position of the line of action is such, as to be tangent to the cylindrical base surfaces of the worm wheel and of said member.

If the threaded member were moved bodily in the direction of line of action 49, for instance so that its contact point with base surface 50 is displaced between points 51, 51', then the line of action would continuously stay at the same place, and would not shift on surface 18.

Often feed is effected in radial direction 51—52, Fig. 5. For convenience such feed can be considered composed of a displacement along line of action 49, of a displacement along the axis 53 of the threaded member, and of a displacement in the direction of the axis of wheel 15. The first said two displacements have no effect on the position of the new line of action, which is shifted in the direction of the wheel axis an amount equal to the last said component. The components may be determined through known geometrical addition or vector addition. 51—51' is the projection of the first said component (Fig. 5); 51'—54 is the projection of the second component, and 54—52 is the last named component in full size. Through a radial displacement 51—52 of the threaded member the line of action is placed in the direction of the wheel axis a distance 24'—55, which is equal to distance 54—52. The new position of the line of action is indicated in dotted lines 56.

In such cases where the displacement of the line of action is not large enough for enveloping the entire surface 18 during a radial approach or recess, an oblique approach or recess may be resorted to. So feed may be provided in a direction 51—57, which is oppositely inclined as compared with the direction of the projected line of action 49.

The threaded member 25 may be conveniently embodied as a hob, which according to the above may be approached to a wheel blank in direction 57—51, or often in radial direction 52—51. Hob and blank are rotated in timed relation on their axes, while at the same time an additional turning movement is imparted either to the hob or to the blank. To produce helical surfaces 18, the additional turning movement is in direct proportion to the feed, and in such a proportion, that the threads of said member are maintained in contact with the involute helical surfaces 18.

When it is desired to produce surfaces which are more convex than an involute helical surface, the said additional turning movement is made at a rate changing with the approach, so that the hob threads remove more stock at the outward end of said surface.

In large size worm gearing, it may be sometimes desired to produce also surfaces 19 (or 37) while the hob is bodily moved. A hob of reduced size may be obtained in this manner.

Preferably however surfaces 19 (or 37) are produced in one relative position of the hob axis with respect to the wheel axis. In this position the hob may be given a helical feeding motion about its axis, if so desired. The said component surfaces could then be completely enveloped on a rotating blank by a single cutting edge, which is turned on its axis and which is fed in a straight path, namely a path inclined to a plane perpendicular to the wheel axis.

Fig. 8 and Fig. 9 diagrammatically show a helical member 60 in engagement with a worm wheel 61. The worm wheel 61 is provided with composite tooth surfaces, as described, of which one component surface is a mating surface of member 60, so that it may be swept in its entirety by said member, when said member and the worm wheel are rotated on their axes 62, 63 in a single bodily position.

In this embodiment the projected axis 62 is seen to pass through the center 64 of worm wheel 61. The said component surface may then be simultaneously swept or enveloped on both sides of the teeth by a member 60 of suitable thread thickness.

In cutting, the said component surface may be formed with a helical hob, simultaneously on both sides of the teeth, whereas the other component surface above referred to may be generated on one side of the teeth during the approach of the hob relatively to the worm wheel blank, and on the other side of the teeth during the recess, if so desired. If no tooth contact is desired at said other component surface, the latter may also be so shaped, that it may be enveloped by the hob in a single bodily position, which differs from the hob position in which said one component surface is formed.

In the embodiment indicated in Fig. 10, one component surface of the tooth sides of worm wheel 65 is a mating surface of a helical member 66, whose projected axis 67 is offset to one side from the center 68 of worm wheel 65. Fig. 10 refers to one side of the wheel teeth, and Fig. 11 refers to the other side. It is seen that helical member 66 is laterally offset in opposite directions from wheel center 68, for enveloping said one component surface of opposite tooth sides respectively.

If so desired, opposite tooth sides of worm wheel 65 may be cut with two hobs respectively, which represent duplicate members 66, and which may be disposed on opposite sides of the worm wheel. Such arrangement is indicated in Fig. 11, where dotted lines 66' denote the member also shown in Fig. 10 and disposed here on the opposite side of wheel 65.

The component surfaces having a concave curvature in a direction lengthwise of the teeth are formed in the position of closest approach of the hob axis (67) and wheel axis 70. In this position an axial feed of the hobs may be provided, if so desired, in the manner of a conventional worm wheel generation. The other component surfaces may be generated with said two hobs during their approach or recess with respect to the worm wheel.

The approach does not need to be in radial direction, but may be in a direction comprising a radial component and a component lengthwise of the wheel axis.

Another direction of approach is outlined in Fig. 12, namely a direction tangential to the worm wheel, to which preferably a radial component is added. The hob represents the helical member, which is shown in two positions 71, 71' corresponding to different degrees of approach.

Worms intended to mesh with worm wheels having composite tooth surfaces are preferably provided with active thread sides extending along single surfaces, that is to say along non composite surfaces. So worm 75 indicated in Fig. 13 and Fig. 14 contains thread sides which are mating surfaces of a circular rack 76, having an axis 77 angularly disposed to the axis 78 of worm 75. Circular rack 76 preferably contains conical side surfaces 80, which are spaced at a constant distance from each other. The projection of axis 77 is seen to pass through the worm center 81 (Fig. 13). However, if so desired, disposition may be made as indicated in Fig. 15, namely so that the projected axis 77' of circular rack 76' is offset to one side from the center 82 of worm 83.

The thread sides of the worm may be swept by the circular rack, when the worm is turned on its axis and the circular rack is moved lengthwise of its own axis in a constant proportion to the turning motion of the worm.

Fig. 16 diagrammatically illustrates the case, where a worm 85 is fully conjugate to a helical threaded member 86 of cylindrical form, whose axis 87 is angularly disposed to and offset from the axis 88 of worm 85.

The present invention is of course applicable to left hand worm gearing as well as to right hand worm gearing, and it should be clearly understood that it may also be applied to worms having composite tooth surfaces and meshing preferably with worm wheels having single, non composite, tooth surfaces.

Various further modifications may be made in my invention by simply applying established practice and current knowledge of the art to the principles here disclosed, and without departing from its spirit.

What I claim is:

1. Worm gearing, comprising two conjugate worm gears each containing differing profiles in parallel planes perpendicular to its axis, one of said worm gears having composite tooth surfaces, a composite tooth surface containing two individual surfaces meeting along a line extending obliquely over the tooth surface, at least one of said individual surfaces being a surface envelopable by a member containing tooth like projections of constant side profile in all axial planes.

2. Worm gearing, comprising a worm having a different cross sectional shape in parallel planes perpendicular to its axis and a conjugate worm wheel having composite tooth surfaces, a composite tooth surface of the worm wheel containing two individual surfaces meeting along a line extending obliquely over the tooth surface, at least one of said individual surfaces being a surface envelopable by a helical threaded member of constant axial pitch.

3. Worm gearing, comprising a worm having a different cross sectional shape in parallel planes perpendicular to its axis and a conjugate worm wheel, said worm wheel containing tooth surfaces which terminate along a line inclined less than forty degrees to the direction of the wheel axis, a tooth surface being a surface envelopable by a member containing tooth like projections of constant side profile in all axial planes.

4. Worm gearing, comprising a worm having a different cross sectional shape in parallel planes perpendicular to its axis and a conjugate worm wheel, said worm wheel containing tooth surfaces terminating along a line inclined less than forty degrees (40°) to the direction of the wheel axis, said tooth surfaces being such as may be enveloped by a single cutting edge which is rotated in engagement with a rotating wheel blank while being fed along a straight line angularly disposed to a plane perpendicular to the wheel axis.

5. Worm gearing, comprising a worm having a different cross sectional shape in parallel planes perpendicular to its axis and a conjugate worm wheel having composite tooth surfaces, a tooth surface of the worm wheel containing two surfaces joining in a line extending obliquely over the said tooth surface, one of said surfaces having a concave curvature in a direction lengthwise of the teeth, said one surface being such as may be enveloped by a single cutting edge which is rotated in engagement with a rotating wheel blank while being fed along a straight line angularly disposed to a plane perpendicular to the wheel axis.

6. Worm gearing, comprising a worm having a different cross sectional shape in parallel planes perpendicular to its axis and a conjugate worm wheel having composite tooth surfaces, a composite tooth surface of said worm wheel containing individual surfaces of which one has a concave curvature in a direction lengthwise of the teeth, said one surface being a mating surface of a helical thread, so that it may be swept in its entirety by said helical thread when said thread and said worm wheel are rotated on their axes in a single bodily position.

7. Worm gearing, comprising a worm having a different cross sectional shape in parallel planes perpendicular to its axis and a conjugate worm wheel having composite tooth surfaces, a composite surface of said worm wheel containing individual surfaces of which one has a concave curvature in a direction lengthwise of the teeth, said one surface being a mating surface of an involute helical thread, so that it may be swept in its entirety by said thread when said thread and said worm wheel are rotated on their axes in a single bodily position.

8. Worm gearing, comprising a worm having a different cross sectional shape in parallel planes perpendicular to its axis and a conjugate worm wheel having composite tooth surfaces, a composite tooth surface containing an individual surface having a concave curvature in a direction lengthwise of the teeth and another individual surface free from concave curvature, said surface of concave curvature being a mating surface of a helical threaded member, so that it may be swept in its entirety by said member when said member and said worm wheel are rotated on their axes in a single bodily position, said member having a smaller number of threads than said worm.

9. Worm gearing, comprising a worm of hour glass shape and a conjugate worm wheel having composite tooth surfaces, a composite tooth surface of said worm wheel containing an individual surface having a concave curvature in a direction lengthwise of the teeth and another individual surface free from concave curvature, said surface of concave curvature occupying more than one half of the total tooth surface and being a mating surface of a helical threaded member, so that it may be swept in its entirety by said member when said member and said worm wheel are rotated on their axes in a single bodily position, said member having a smaller number of threads than said worm and being offset from said wheel a distance smaller than the center distance of said worm and worm wheel.

10. Worm gearing, comprising a worm of hour glass shape and a conjugate worm wheel mounted on axes disposed at right angles to each other, said worm wheels having composite tooth surfaces, a composite tooth surface containing an individual surface having a concave curvature in a direction lengthwise of the teeth and another individual surface extending back of the continuation of the first said surface, said surface of concave curvature being a mating surface of a helical threaded member, so that it may be swept in its entirety by said member when said member and said worm wheel are rotated on their axes in a single bodily position, said axes being disposed at an acute angle to each other and being offset from each other a distance smaller than the center distance of said worm and worm wheel.

11. Worm gearing, comprising a worm of hour glass shape and a conjugate worm wheel having composite tooth surfaces, a composite tooth surface of said worm wheel containing two individual enveloped surfaces joining each other along a line extending obliquely over said tooth surface, one of said individual surfaces extending back of the continuation of the other except at said line, said other individual surface being a mating surface of a helical threaded member, so that it may be swept in its entirety by said member when said member and said worm wheel are rotated on their axes in a single bodily position, the mean pressure angle of said member being smaller than the pressure angle of said worm wheel at its pitch point.

12. Worm gearing, comprising a worm of hour glass shape and a conjugate worm wheel having composite tooth surfaces, a composite tooth surface containing two individual enveloped surfaces joining each other smoothly along a line extending obliquely over said tooth surface, one of said individual surfaces extending back of the continuation of the other except at said line, said other individual surface being a mating surface of a helical threaded member, so that it may be swept in its entirety by said member when said member and said worm wheel are rotated on their axes in a single bodily position, the lead of said member being smaller than the lead of a helical member of equal diameter and equal thread number and which matches said worm wheel at its pitch point.

13. Worm gearing, comprising a worm of hour glass shape and a conjugate worm wheel having composite tooth surfaces, a composite tooth surface containing two individual enveloped surfaces joining each other along a line extending obliquely over said tooth surface, one of said individual surfaces extending wholly back of the continuation of the other except at said line, said other individual surface being a mating surface of an involute helical member, so that it may be swept in its entirety by said member when said member and said worm wheel are rotated on their axes in a single bodily position, the mean pressure angle of said member being smaller than the pressure angle of said worm wheel at its pitch point.

14. Worm gearing, comprising a worm of hour glass shape and a worm wheel having composite tooth surfaces, a composite tooth surface of said worm wheel containing two individual enveloped surfaces joining each other along a line extending obliquely over said tooth surface, one of said individual surfaces extending wholly back of the continuation of the other except at said line, said other individual surface being a mating surface of a helical threaded member, so that it may be swept in its entirety by said member when said member and said worm wheel are rotated on their axes in a single bodily position, the axis of said member being offset to one side from the center of said worm wheel.

15. A worm gear having composite tooth surfaces, a composite tooth surface containing two individual enveloped surfaces joining each other along a line extending obliquely over the tooth surface, one of said individual surfaces extending back of the continuation of the other and occupying at least one fifth of the total tooth surface, said other individual surface being a mating surface of a helical threaded member of the same hand as said worm gear and having an axis offset from and angularly disposed to the axis of said worm gear.

16. A worm gear having composite tooth surfaces, a composite tooth surface containing two individual enveloped surfaces joining each other along a line extending obliquely over the tooth surface, one of said individual surfaces extending back of the continuation of the other and occupying at least one fifth of the total tooth surface, said other individual surface being a mating surface of a rotary member having tooth like projections, the profiles of said projections being equal all along their length and being equally disposed with respect to the axis of rotation, said axis being offset from and angularly disposed to the axis of said worm gear and being positioned offset to one side from the center of said worm gear.

17. A worm gear having composite tooth surfaces, a composite tooth surface containing two individual enveloped surfaces joining each other along a line extending obliquely over the tooth surface, one of said individual surfaces extending back of the continuation of the other and occupying at least one fifth of the total tooth surface, said other individual surface being a mating surface of a cylindrical member having tooth like projections, said projections having equal profiles along their length, the axis of said member being offset from and disposed at an acute angle to the axis of said worm gear.

18. A worm gear having composite tooth surfaces, a tooth surface containing two individual surfaces joining each other along a line extending obliquely over the tooth surface, said individual surfaces being such as may be enveloped by a cylindrical member having tooth like projections of constant axial pitch, said two individual surfaces being envelopable by the same member in different positions of the axis of said member with respect to the axis of said worm gear.

19. A worm gear having composite tooth surfaces, a tooth surface containing two individual surfaces joining each other along a line extending obliquely over the tooth surface, said individual surfaces being such as may be enveloped by a helical threaded member of constant axial pitch, said two individual surfaces being envelopable by the same member in different positions of the axis of said member with respect to the axis of said worm gear.

ERNEST WILDHABER.